D. McDUFF.
CENTER AND SURFACE TESTING INDICATOR.
APPLICATION FILED OCT. 21, 1920.

1,426,207.  Patented Aug. 15, 1922.

Inventor:
Daniel McDuff
by Van Evren Fish Hildreth & Leary
Attys

UNITED STATES PATENT OFFICE.

DANIEL McDUFF, OF DORCHESTER, MASSACHUSETTS.

CENTER AND SURFACE TESTING INDICATOR.

1,426,207. Specification of Letters Patent. Patented Aug. 15, 1922.

Application filed October 21, 1920. Serial No. 418,354.

*To all whom it may concern:*

Be it known that I, DANIEL McDUFF, a citizen of the United States, residing at Dorchester, in the county of Suffolk and State of Massachusetts, have invented certain new and useful Improvements in Center and Surface Testing Indicators; and I do hereby declare the following to be a full, clear, and exact description of the invention, such as will enable others skilled in the art to which it appertains to make and use the same.

This invention relates to an indicator adapted to be used as a center or surface tester. The object of the invention is to improve the construction of such indicators to provide a more durable, simple and efficient construction.

To these ends one feature of the invention contemplates a construction of indicator comprising a supporting member, a flexible feeler mounted upon the supporting member, and an indicating member arranged to be moved by movements of the flexible feeler. Other features of the invention reside in the improved construction of indicator by which all of the parts of the indicator are assembled with rigid connections, thus producing a durable instrument and one in which the usual lost motion between the feeler and its support is eliminated.

These and other features of the invention will be pointed out in the specification and claims.

Figure 1:
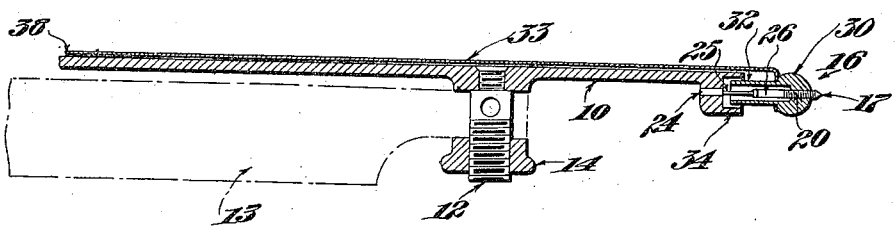
Figure 2:
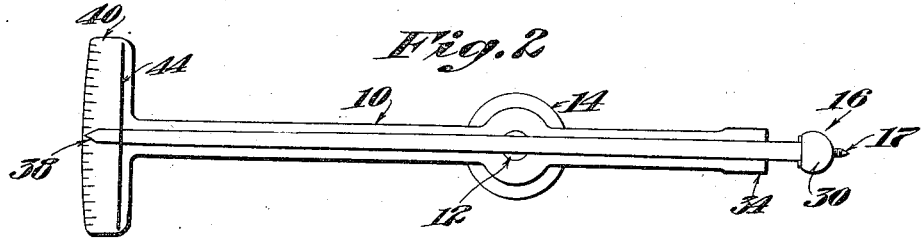

In the drawing illustrating the preferred embodiment of the invention, Fig 1 illustrates a sectional view of the indicator; Fig. 2 a plan; and Fig. 3 a partial elevation showing the manner of mounting the indicator upon the spindle of a surface gage.

The improved indicator comprises in general a body portion or supporting member adapted to be secured to the tool post of a lathe or to the spindle of a surface gage. A feeler is flexibly mounted upon the supporting member, preferably by a spring rigidly secured to the supporting member. An indicating member is operatively connected with the feeler to be moved by flexural movements of the feeler. The feeler is adapted to be flexurally moved by movements of the center of the work (if the instrument is used as a center tester) and also by variations in the surface of the work (when the instrument is used as a surface tester).

The preferred embodiment of the invention is described as follows: The body portion or supporting member 10 is provided with a stud 12 secured therein adapted to pass through a hole in a bar 13 or other instrument secured in the tool post of a lathe or similar machine tool. A nut 14 is screwed on the threaded end of the stud 12 and operates to secure the body portion 10 in fixed relation on the bar 13 and thereby to the tool post of the lathe. A feeler 16 comprising a wire 20, the end of which is pointed to form a centering pin 17, is driven into a socket 24 at the end of the body portion 10 so as to be rigidly mounted therein. Between the body portion 10 and the feeler 16, the wire 20 is provided with two flattened surfaces 25, 26. The surface 25 extends horizontally and the surface 26 extends vertically thus forming a spring capable of flexure in two directions between the feeler and the body portion 10.

The feeler 16 further comprises a spherical head 30 screwed upon the end of the wire 20, as shown in Fig. 1, and which is adapted to be flexurally moved therewith. The spherical head 30 is provided with a projecting sleeve 32 embracing the wire 20 and the end of which is received within an enlarged socket 34 in the end of the body portion 10. In the normal use of the instrument, as the feeler 16 is moved back and forth the sleeve 32 engages the inside surface of the socket 34, and in this manner prevents undue movements of the feeler, so that excessive strain is eliminated from the double leaf spring. A thin flat pointer 33 is soldered or otherwise secured to the spherical head 30 and the free end 38 of the pointer is arranged to traverse a graduated scale 40 upon the upper surface of the body portion 10. A restraining wire 44 secured to the body portion is extended across the graduated scale 40 and serves to limit the upward movement of the end of the pointer.

In using the indicator as a center tester, the body portion 10 is secured to the tool post of the lathe or other machine tool in the manner indicated in Fig. 1. The indicator is then run forwardly until the centering pin 17 of the feeler 16 engages a preformed hole in the center of the work and whose position with relation to the center of the chuck it is desired to test. If the position of the preformed hole in the work lies without the true center then as the work is oscillated the centering pin 17, being held in engagement with the preformed hole, is caused to oscillate in a circle about the true center. The movements of the centering pin 17 are transmitted through the spherical head 30 to the end of the elongated pointer 33 and operate to cause the latter to oscillate back and forth across the graduated scale. The extent to which the end of the pointer moves upon each side of the central line or zero position of the pointer quantitatively indicates the radial distance of the preformed hole from the true center. The position of the work in the chuck may then be adjusted and the position of the preformed hole again tested until it is made to coincide with the true center.

It will be observed that the elongated pointer 33 is of such construction that it may be readily flexed vertically by movement of the feeler in a vertical direction. It will therefore be apparent that during the use of the instrument as the feeler is oscillated in a circle, the vertical movements of the feeler are taken up by the flexure of the thin flat pointer, with the result that the end 38 of the pointer is only moved to a small extent in a vertical direction, and that the oscillations of the feeler in a horizontal direction are quantitatively transmitted to the end of the pointer so as to cause it to swing in direct accordance with the extent of the oscillations.

In using the instrument for testing inside surfaces the spherical head 30 is utilized as a feeler and the variations in the path of rotation of the inside surface from a true circle indicate by means of the pointer, the extent that the work varies from a true central position.

Figure 3:
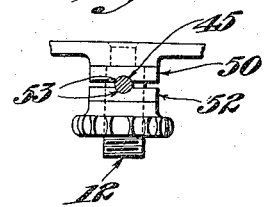

When the instrument is used in connection with a surface gage the stud 12 is provided with washers 50, 52 having cooperating recessed portions 53 within which the spindle 45 of the surface gage is clamped by the knurled nut 14 in the manner illustrated in Fig. 3. The spherical head 30 is used as a feeler when the instrument is used for surface testing.

From the description thus far it will be observed that the improved indicator is simple in construction, and that the double leaf spring connecting the feeler with the body portion enables a very sensitive feeling action to be secured, so that small variations of the work from a centered position or in the surface of the work (when the instrument is used as a surface tester) may be easily detected. Furthermore, the construction is very durable and one that can be manufactured at a minimum expense.

Having thus described the invention, what is claimed is:—

1. An indicator adapted for use as a center or surface tester comprising a supporting member, a flexible member secured to the supporting member, a feeler mounted thereon and movably supported thereby, and an indicating member arranged to be moved by movements of the feeler upon flexure of the flexible member.

2. An indicator adapted for use as a center or surface tester comprising a supporting member, a feeler, a spring connecting the feeler and supporting member comprising the sole support for the feeler, and an indicating member arranged to be moved by movements of the feeler.

3. An indicator adapted for use as a center or surface tester comprising a supporting member, a feeler, a spring capable of flexure in two directions connecting the feeler and supporting member and by which the feeler is flexibly connected to the supporting member, and an indicating member arranged to be moved by movements of the feeler.

4. An indicator adapted for use as a center or surface tester comprising a supporting member, a flexible member secured to the supporting member, a feeler mounted thereon and movably supported thereby, and an indicating member arranged to be moved by movements of the feeler upon flexure of the flexible member, said feeler being provided with a centering pin and a spherical head.

5. An indicator adapted for use as a center or surface tester comprising a supporting member, a feeler having a centering pin and a spherical head, a spring rigidly secured to the supporting member and by which the feeler is supported, and a pointer carried by the feeler arranged to move therewith.

6. An indicator adapted for use as a center or surface tester comprising a supporting member, a wire rigidly secured thereto, the outer end of which is pointed to form a centering pin, a spherical head screwed upon the outer end of said wire, and a pointer secured to and carried by said spherical head and arranged to be moved by flexure of said wire.

7. An indicator adapted for use as a center or surface tester comprising a supporting member, a flexible member secured to the supporting member, a feeler mounted thereon and movably supported thereby, an indicating member arranged to be moved by movements of the feeler upon flexure of the flexible member, and means for limiting the extent of movements of the feeler.

8. An indicator adapted for use as a center or surface tester comprising a supporting member, a feeler flexibly mounted thereon and having a spherical head and centering pin, a pointer carried by the spherical head arranged to be moved therewith, and a sleeve secured to said spherical head arranged to cooperate with the supporting member to limit the extent of movements of the feeler.

DANIEL McDUFF.